G. E. A. HALLETT.
METHOD AND APPARATUS FOR HEATING THE EXPLOSIVE MIXTURE OF AN INTERNAL COMBUSTION ENGINE.
APPLICATION FILED FEB. 25, 1921.
1,432,751.
Patented Oct. 24, 1922.
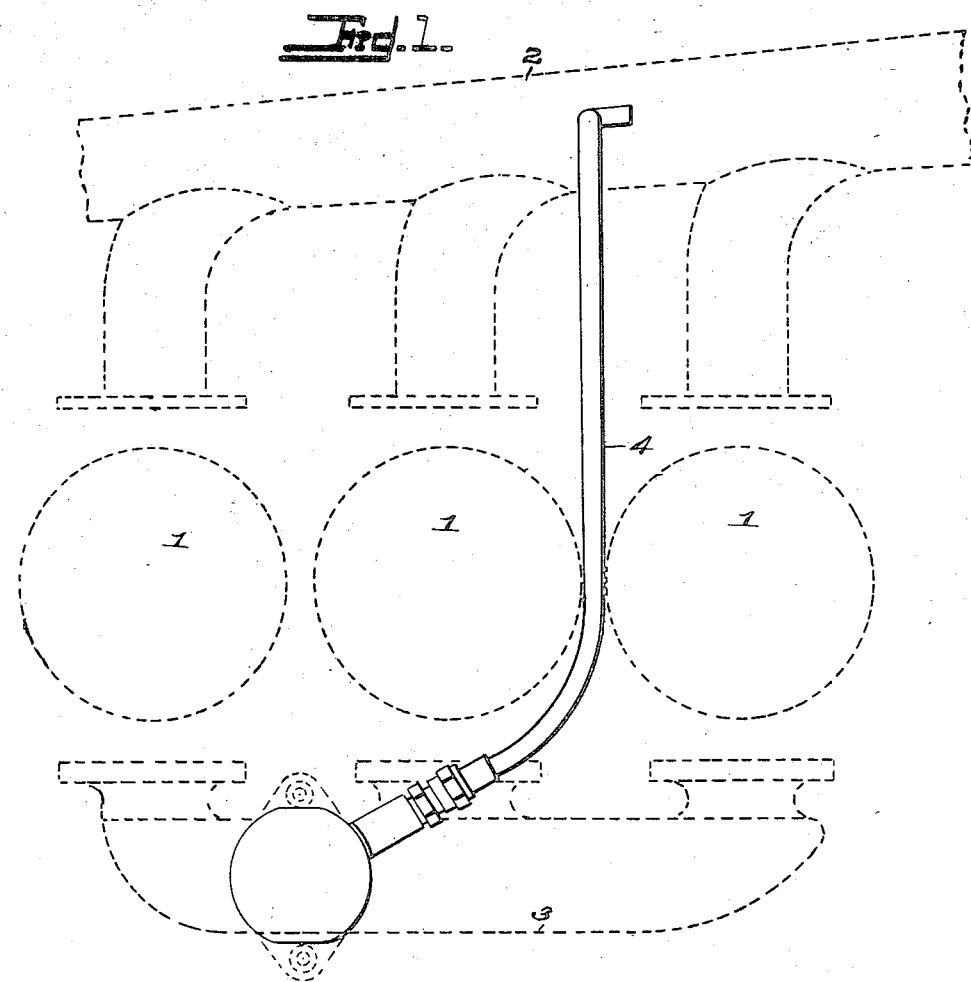
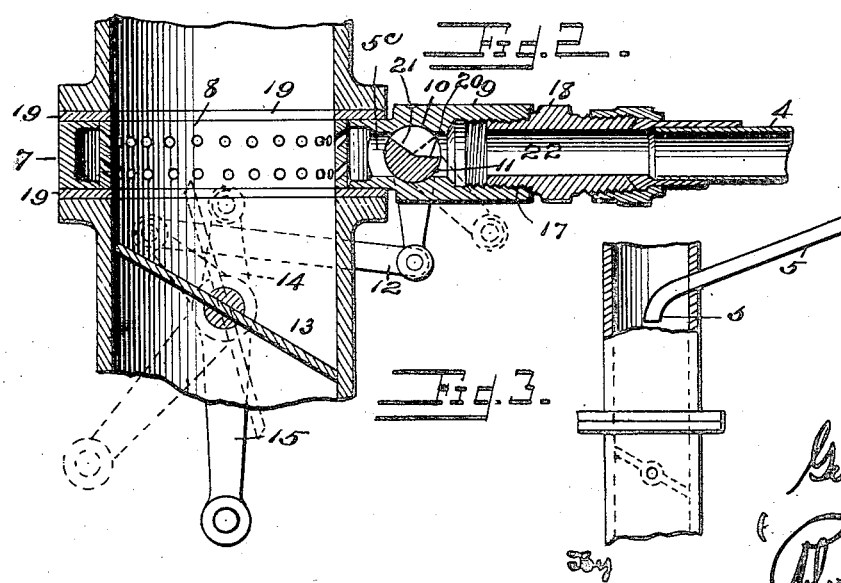

Patented Oct. 24, 1922.

1,432,751

UNITED STATES PATENT OFFICE.

GEORGE E. A. HALLETT, OF DAYTON, OHIO.

METHOD AND APPARATUS FOR HEATING THE EXPLOSIVE MIXTURE OF AN INTERNAL-COMBUSTION ENGINE.

Application filed February 25, 1921. Serial No. 447,839.

*To all whom it may concern:*

Be it known that I, GEORGE E. A. HALLETT, a citizen of the United States, residing at Dayton, in the county of Montgomery and State of Ohio, have invented certain new and useful Improvements in Methods and Apparatus for Heating the Explosive Mixture of an Internal-Combustion Engine, of which the following is a specification.

This invention relates in general to a method for heating the explosive mixture of an internal combustion engine, and more particularly to means for admitting a portion of the exhaust gases into the intake manifold for the purpose of thoroughly warming and volatilizing the same.

I am aware that it is not new to heat the intake or explosive mixture by means of the waste heat from the exhaust. In many instances it has been proposed to provide a casing, or "stove" around the intake manifold and to conduct a portion of the exhaust through the casing or "stove" to provide for the desired heat transfer between the exhaust and the intake mixtures.

In other instances, I am aware, it has been proposed to admit a portion of the exhaust gases into the intake manifold itself to provide for the required heat transfer and also to perform the additional useful function of utilizing some of the waste unexploded mixture always present in the exhaust. Such a device is particularly necessary for starting or idling and it is desired that the best heating effect be obtained. However, at higher engine speeds such heating is needed to a lesser degree if at all and it is desired that an automatic or at least semi-automatic arrangement, controlled preferably by the speed of the engine be provided to automatically control the amount of exhaust admitted.

My invention, however, consists specifically in the means for conducting and controlling the flow of the exhaust to the intake manifold and admitting it thereinto for the purpose described.

A complete disclosure is found in the accompanying drawings, in which:

Figure 1 is a top plan view;

Figure 3 is a modification of the intake manifold inlet in side elevation; and

Figure 2 is a vertical section in detail of the intake manifold showing the direction of the outlet of the connection pipe.

Referring specifically to the drawings, 1 is an internal combustion engine having an exhaust manifold 2 and an intake manifold 3. Connecting the exhaust manifold and intake manifold is a pipe 4. Pipe 4 is tapped into or is otherwise secured into the exhaust manifold 2 in such a manner that a portion 5 of said pipe extends into the exhaust manifold and has a portion which extends parallel to the exhaust manifold in such a way that its open end 5ª is "down stream" of the gases flowing therethrough.

The connection pipe is adapted to provide for the ingress of the exhaust gases into the intake manifold as shown in Figs. 2 and 3 in a direction "up stream" of or in a direction contrary or opposite to that of the flow of the explosive mixture through said intake manifold.

In Figure 3 a simple tap arrangement is shown where the outlet of the connecting pipe is inserted into the manifold and extends parallel with said pipe with its outlet opening 5ᶜ facing the incoming explosive gases. A valve arrangement may be placed in the connecting pipe shown in Fig. 3 as is shown in Fig. 2, if desired.

In Fig. 2 the connecting pipe leads to an annular casing 7. This casing 7 may be placed anywhere along the intake manifold but in the preferred embodiment shown it is designed and adapted to be placed between the usual lower intake manifold flange and the corresponding flange of the carbureter outlet pipe. This will provide for simplicity of structure and ease and economy of assembly.

Casing 7 has an inner bore slightly greater than that of the intake manifold to provide for the reception and seating of a ring 8 which is provided with a series of downwardly extending perforations, the purpose of which will be hereinafter described.

Integral with the casing 7 is an extension 9 which provides a valve seat 10 for a valve 11 which is connected by a linkage 12 with an extension 14 of the arm 15 which operates the throttle butterfly valve 13. Extension 9 is provided at a point outward of the valve seat 10 with an internally screw-threaded portion 17 for the reception of a nipple 18 to connect the connecting pipe 4 to the casing 7.

Gaskets 19 are shown for the purpose of preventing escape of gas. It will be noted that when the throttle valve is closed the face 21 of valve 11 nearly closes the passage 22. As the throttle is opened it will be noted that the valve 11 will provide for a corresponding opening to the passage 22 until the half throttle position is reached after which, as will be noted, face 20 of the valve will again nearly close the passage 22 as indicated by the dotted line position of valve face 20.

From the foregoing description my device will be seen to operate as follows: When the engine is first started or is idling, that is when the greater heat from the exhaust is desired, the stream of gases passing out the exhaust manifold will be moving at a comparatively low speed a portion of the exhaust gas responding to the low pressure in the intake manifold will then pass through the opening 5ª of the connecting pipe through the connecting pipe 5 and into the intake manifold where it will, by reason of the direction of its ingress, thoroughly disturb and mix with the oppositely moving explosive mixture. As can readily be seen this will provide for a thorough heat transfer and the warming and volatilizing of the explosive mixture.

It will be noted that, as the engine speed is increased the speed of the gases flowing through the exhaust manifold will be correspondingly augmented, with the result that since part 5 of pipe 4 extends down stream the pressure at the opening 5ª will be lowered and there will be less tendency of the exhaust gases to flow through said pipe 4. Further, the rate of flow of the gases in the intake manifold increasing with the engine speed, these explosive gases will, by reason of the direction of ingress of the exhaust gases, offer greater opposition to the entrance of the exhaust gases into the intake manifold. Thus it will be seen that I have provided a means whereby the proportion of exhaust gases admitted to the intake manifold may be automatically controlled by the engine speed.

With reference to the modification specifically shown in Fig. 2 it will be noted that in addition to the automatic control there is provided a valve controlling the passage of gases through the connecting pipe. This valve as hereinbefore described, is connected by a linkage to the butterfly throttle valve and is again controlled by the throttle opening or, that is to say, the engine speed. It is believed that my invention satisfactorily meets all of the requirements of providing for a thorough warming of the intake mixtures in the most advantageous manner, supplying the greatest amount of heat where most needed and automatically diminishing the amount of heat supplied when the engine has obtained its full speed.

Another feature of my invention is shown in that the plate 8 by reason of the high degree of heat which it will obtain will act as a hot spot to prevent "creepage" of any small particles of liquid fuel up the sides of the intake manifold.

An additional feature of my invention will also be found in that this arrangement will provide to a certain extent for a reduction of the vacuum in the intake manifold and hence will increase the mechanical efficiency of the engine at idling speeds.

It is pointed out that my invention will make possible the use of comparatively low grade fuels in that they will be thoroughly vaporized by my heating device.

It is further to be noted that there will be supplied a certain amount of unconsumed fuel in the exhaust which is admitted, thus providing a charge in excess of that normally obtained from the carburetter.

What I claim is:

1. In an internal combustion engine, an intake manifold and an exhaust manifold, and connecting means between said intake manifold and said exhaust manifold for the purpose described, said connecting means being provided with an inlet opening in the exhaust manifold facing down stream of the flow of exhaust gases therein.

2. In an internal combustion engine, an intake manifold and an exhaust manifold, and connecting means between said intake manifold and said exhaust manifold for the purpose described, said connecting means being provided with an inlet opening in the exhaust manifold facing down stream of the flow of exhaust gases therein, said connecting means being provided with an outlet opening extending into the intake manifold and facing up stream of the explosive gases flowing therein.

3. In an internal combustion engine, an intake manifold and an exhaust manifold, a pipe connecting the exhaust manifold with the intake manifold and adapted to conduct a portion of the exhaust gases from said exhaust manifold to said intake manifold, and means dependent solely on the engine speed for controlling the passage of said exhaust gases through said connecting pipe, said connecting pipe having its inlet opening in the exhaust manifold and facing downstream of the exhaust gases flowing in said exhaust manifold.

4. In an internal combustion engine, an intake manifold and an exhaust manifold, a pipe connecting the exhaust manifold with the intake manifold and adapted to conduct a portion of the exhaust gases from said exhaust manifold to said intake manifold, and means dependent solely on the engine speed for controlling the passage of said exhaust gases through said connecting pipe, said connecting pipe having its outlet opening in the intake manifold and facing in a direction up stream of the explosive gases flowing in said intake manifold, said connecting pipe having its inlet opening in the exhaust manifold and facing in the direction down stream of the exhaust gases flowing therein.

5. In an internal combustion engine, an intake manifold and an exhaust manifold, a pipe connecting the exhaust manifold with the intake manifold and adapted to conduct a portion of the exhaust gases from said exhaust manifold to said intake manifold, and means for controlling the passage of said exhaust gases through said connecting pipe, comprising a valve operatively connected to throttle valve for said engine whereby the passage of gases may be controlled by the throttle setting, said connecting pipe having its inlet opening in the exhaust manifold and facing in a direction down stream of the flow of exhaust gases in said exhaust manifold.

6. In an internal combustion engine, an intake manifold and an exhaust manifold, a pipe connecting the exhaust manifold with the intake manifold and adapted to conduct a portion of the exhaust gases from said exhaust manifold to said intake manifold, and means for controlling the passage of said exhaust gases through said connecting pipe, comprising a valve operatively connected to throttle valve for said engine, whereby the passage of gases may be controlled by the throttle setting, said connecting pipe having its outlet opening into the intake manifold and facing in a direction up stream of the flow of explosive gases in said intake manifold, said connecting pipe having its intake opening in the exhaust manifold and facing in a direction downstream of the flow of the exhaust gases in said exhaust manifold.

7. In an internal combustion engine, an intake manifold and an exhaust manifold, a pipe connecting the exhaust manifold with the intake manifold and adapted to conduct a portion of the exhaust gases from said exhaust manifold to said intake manifold, means for controlling the passage of the exhaust gases through said intake manifold, said controlling means comprising a valve in said connecting pipe passage and operatively connected to the engine throttle whereby the passage of gases will be controlled by the throttle setting, and an arrangement of the inlet and outlet openings of said connecting pipe having the inlet opening of said connecting pipe in the exhaust manifold facing down stream of the flow of the exhaust gases therein and the outlet of said connecting pipe into the intake manifold and facing in the direction up stream of the flow of the explosive gases in said intake manifold.

8. In an internal combustion engine, an intake and an exhaust manifold, a pipe connecting the exhaust manifold with the intake manifold and adapted to conduct a portion of the exhaust gases from said exhaust manifold to said intake manifold, and means comprising a valve for controlling the passage of said exhaust gases through said connecting pipe, said connecting pipe having its inlet opening in the exhaust manifold and facing in a direction down stream of the flow of exhaust gases in said exhaust manifold.

In testimony whereof I have affixed my signature.

GEORGE E. A. HALLETT.